(12) United States Patent
LoMaglio et al.

(10) Patent No.: US 7,205,507 B2
(45) Date of Patent: Apr. 17, 2007

(54) FOOD COOKING AND HEATING APPARATUS

(76) Inventors: F. Leo LoMaglio, 903 NE. Willow Ct., Oak Grove, MO (US) 67075; Robert G. O'Connor, 7113 W. Weaver Pl., Littleton, CO (US) 80123

( * ) Notice: Subject to any disclaimer, the term of this patent is extended or adjusted under 35 U.S.C. 154(b) by 0 days.

(21) Appl. No.: 11/086,019

(22) Filed: Mar. 21, 2005

(65) Prior Publication Data

US 2006/0113294 A1 Jun. 1, 2006

(51) Int. Cl.
*A21B 1/26* (2006.01)

(52) U.S. Cl. .................. 219/400; 219/413; 126/21 A; 99/476

(58) Field of Classification Search ................. 219/400; 9/482; 426/233, 314
See application file for complete search history.

(56) References Cited

U.S. PATENT DOCUMENTS

| | | | | |
|---|---|---|---|---|
| 4,115,678 A | * | 9/1978 | Tachikawa et al. | ....... 126/21 A |
| 4,132,878 A | * | 1/1979 | Tachikawa et al. | ......... 219/400 |
| 4,812,622 A | * | 3/1989 | Takeda et al. | ............... 219/400 |
| 4,899,026 A | * | 2/1990 | Oh | ............................... 219/710 |
| 4,913,223 A | * | 4/1990 | Mizuno et al. | ............. 219/400 |
| 6,644,178 B2 | * | 11/2003 | Clark | ........................... 99/482 |

* cited by examiner

*Primary Examiner*—Joseph M. Pelham
(74) *Attorney, Agent, or Firm*—Quinn & Quinn, P.C.

(57) ABSTRACT

A food cooking and heating cabinet having a closed air convection system consisting of a variable speed blower in a air heating chamber for circulating air past a variable heating element, through a food holding oven, and back to the air heating chamber, a control for selecting a desired temperature to be maintained in the food holding oven, and means for comparing the temperature at the outlet and the inlet of the heating chamber to the selected temperature causing the air variable heating element to operate and the speed of the blower to increase when more heat is required and reduces both heat and blower speed as the need for the higher heat and air flow is no longer required, and when preset parameters are reached automatically sets the temperature to a preset temperature and holds the heated product to the predetermined temperature.

7 Claims, 4 Drawing Sheets

FOOD COOKING AND HEATING APPARATUS

BACKGROUND OF THE INVENTION

1. Field of the Invention

This invention relates to an improved cooking and heating apparatus for food. More particularly, this invention relates to an improved food cooking and heating apparatus which maintains heated food temperature without rapid deterioration of food quality by regulation of the amount of air flow through the apparatus.

2. Description of the Prior Art

Food cooking and heating cabinets are well-known devices used to cook food slowly and used to maintain heated food at serving temperature. Cooking and holding cabinets have become valuable tools in the food industry, particularly in fast food and institutional applications. They allow food to be cooked in advance and then held at the desired serving temperature. The cabinet must be large enough to hold many servings, yet maintain a uniform temperature throughout. The food texture, moisture, color, and flavor must be maintained during the time period the food is held in the cabinet. The most important quality to be maintained is food moisture.

Early cooking and heating cabinets utilized radiant heating of the oven. A heated outer jacket transfered heat through the oven walls to heat the food therein. The next advance in the art was seen where the heated jacket was closed and the air therein recirculated. These approaches suffer two major drawbacks. First, it has been impossible to achieve uniform heat in the larger cabinets presently in use. Second, an unduly long period of time is required to recover the desired temperature after the oven door is opened.

For this reason, it has been found advantageous to circulate heated air through the oven and around the food. In practice, ovens were modified to provide openings in the oven walls to allow a small portion of heated air to circulate through the oven. In one embodiment, all of the heated air is circulated through the oven and returned to the heating chamber with the use of a blower. A heating element, used to heat the air in a heating chamber, is controlled by a thermostat and a heat sensitive switch. When the air reaches a desired temperature, the heating element is switched off. Uniform heat and quick temperature recovery may be achieved; food quality, however, is decreased due to drying caused by the heated air passing over and around the food.

In another approach to avoid the drying effect, heated air is circulated in a food chamber in a circular pattern around the food which is centered at the "eye of the tornado", where air circulation is minimized.

Other attempts to address the problem of deteriorating food quality include adding moisture back into the air. A water pan is positioned so that the heated air flows over the surface of the water. There are two problems that arise. It is believed that decreasing the drying effect and retaining the natural moisture of food is superior to adding moisture to the atmosphere. Additionally, the water pan requires constant refilling, which is time consuming and is often overlooked by restaurant and institutional attendants.

Therefore, it is a principal object and purpose of the present invention to maximize food quality in a food cooking and heating apparatus by controlling the amount of air and the temperature of the air passing over and around the food.

SUMMARY OF THE INVENTION

The present invention is an improvement over the hot food holding cabinets of the prior art. The present invention provides a food cooking and heating cabinet including a food holding oven having at least one door for access to the interior thereof, an air heating chamber having in inlet and an outlet, an air variable heating element within the air heating chamber, an air intake passageway to conduct heated air from the outlet of the air heating chamber to the food holding oven, an exhaust passageway to conduct air from the food holding oven to the inlet of the air heating chamber, an air temperature sensor located at the outlet of the heating chamber and a second sensor located at the inlet of the air heating chamber, a closed air convection system consisting of a variable speed blower in the air heating chamber for circulating air past the variable heating element, through the intake passageway, through the food holding oven, through the exhaust passageway and back to the air heating chamber, a control for selecting a desired temperature to be maintained in the food holding oven, and a circuit for comparing the sensed temperature at the outlet and the sensed temperature at the inlet of the heating chamber to the selected temperature causing the air variable heating element to operate and the speed of the blower to increase when more heat is required and reduces both heat and blower speed as the need for the higher heat and air flow is no longer required, and when preset parameters are reached automatically sets the temperature to a preset temperature and holds the heated product to the predetermined temperature.

DETAILED DESCRIPTION OF THE PREFERRED EMBODIMENTS

Figure 1:
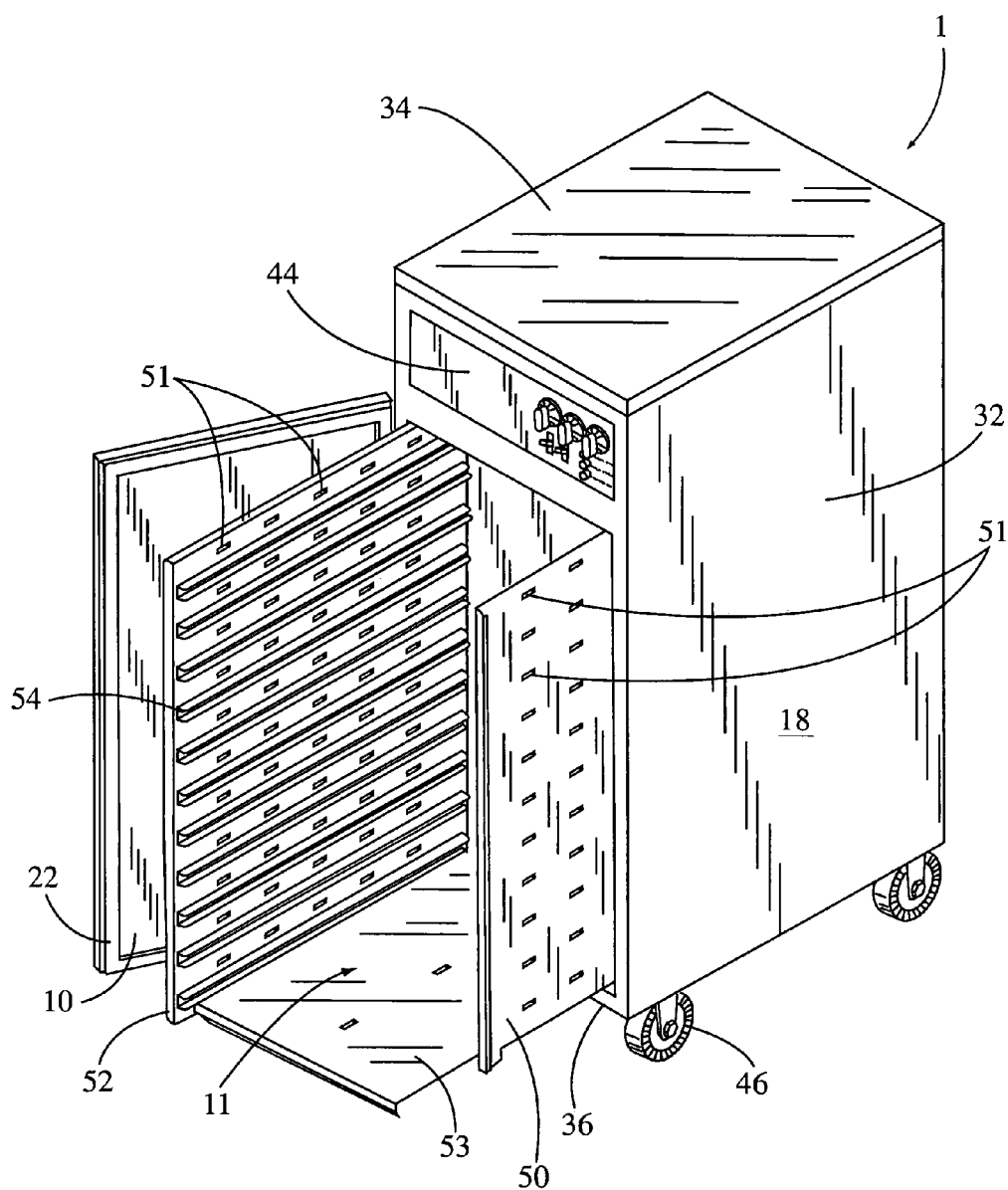
FIG. 1 is a perspective view of a food cooking and heating apparatus constructed according to the present invention, showing removable panels.

Referring to the drawings in detail, FIG. 1 is a perspective view of an embodiment of the food cooking and heating apparatus 1, of the present invention.

While only a single door is required for access, multiple doors may be used. The front door 10 is shown in the open position in the front view of the apparatus seen in FIG. 2. The door is attached to an outside cabinet 18 through use of hinges not shown. A continuous front gasket 22 lies between the cabinet 18 and the front door 10 to create a sealed enclosure when the door is closed. At serving time, the front door may be opened to remove the food.

The outside cabinet 18 has parallel side walls 30 and 32 and a top 34 parallel to a bottom 36. The side walls 30 and 32 and bottom 36 consist of an inner shell 38 and an outer shell 40 and are filled with fiberglass or other insulation to improve heat retention qualities. Likewise, the door 10 consists of an inner shell and an outer shell and is filled with insulation. In the present embodiment, the outside cabinet and doors are fabricated primarily from stainless steel; however, it should be recognized that other materials might be used.

A control panel 44, to be described in detail below, is located at the front of the apparatus 1 above the door 10.

Figure 2:
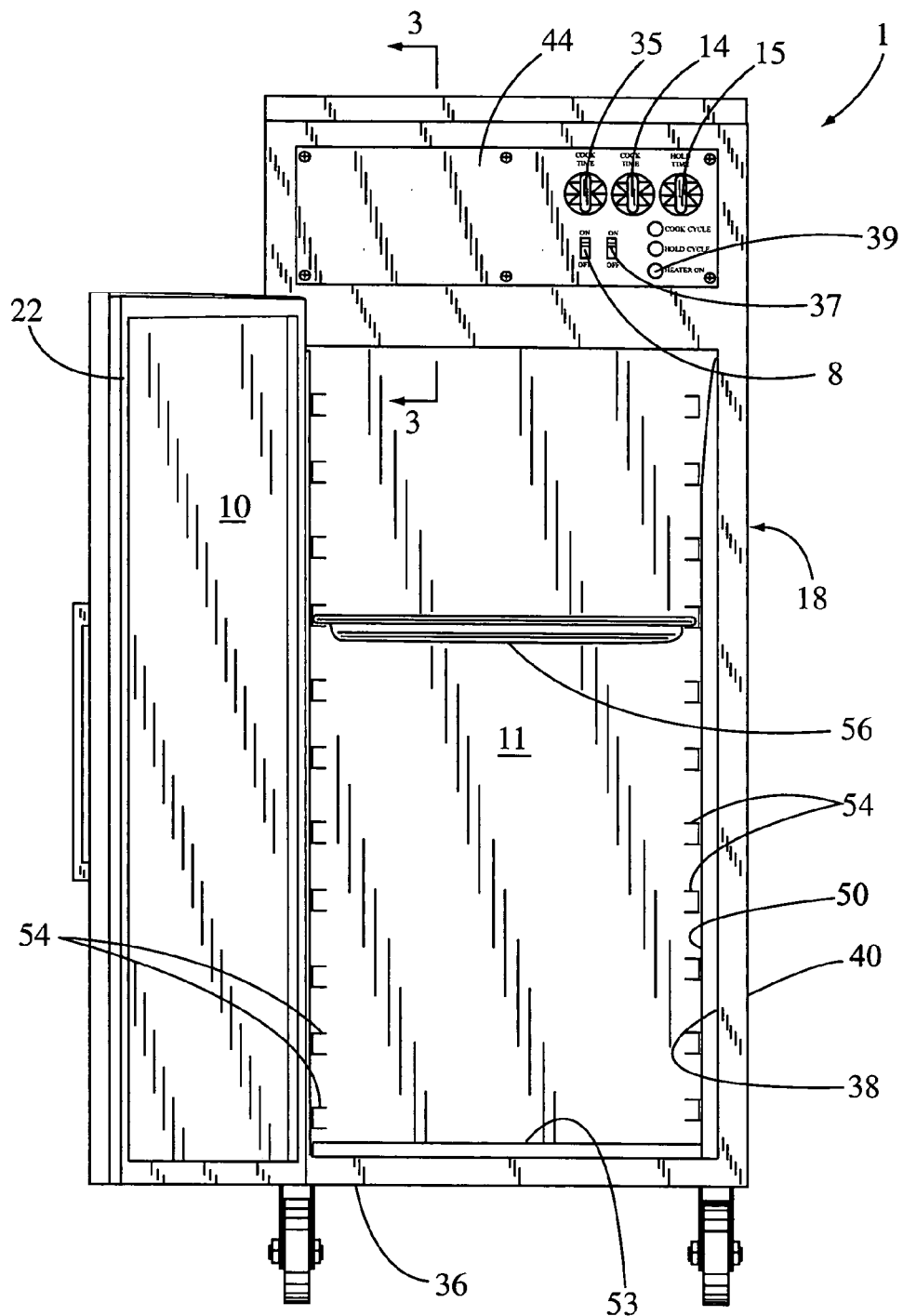
FIG. 2 is a front view of the cooking and heating apparatus shown in FIG. 1 with a front door in the open position.
Figure 3:
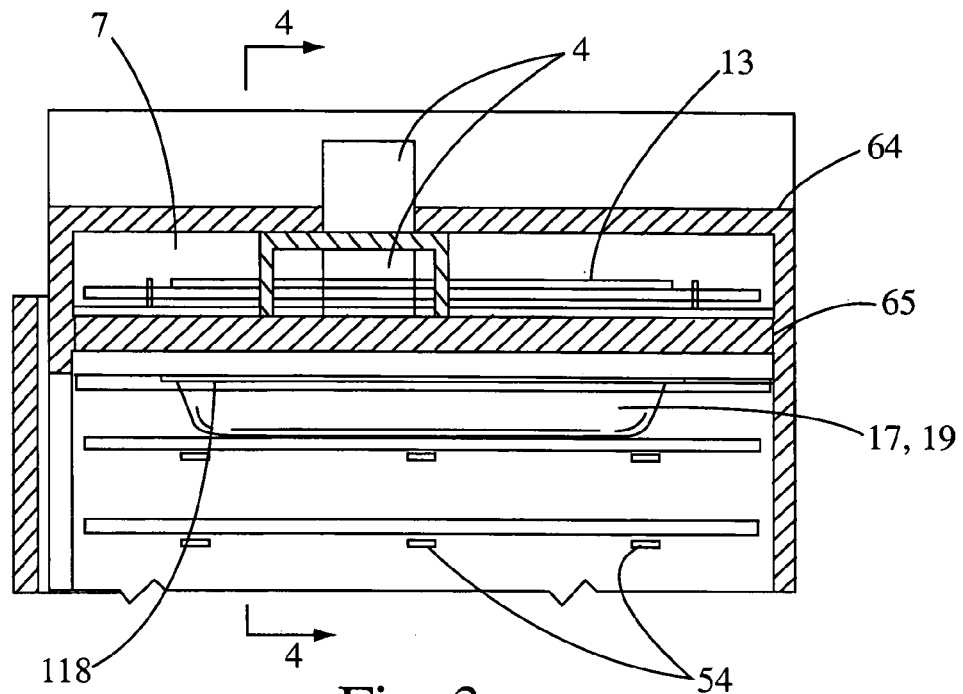
FIG. 3 is a sectional view taken along section line 3—3 of FIG. 2.
Figure 5:
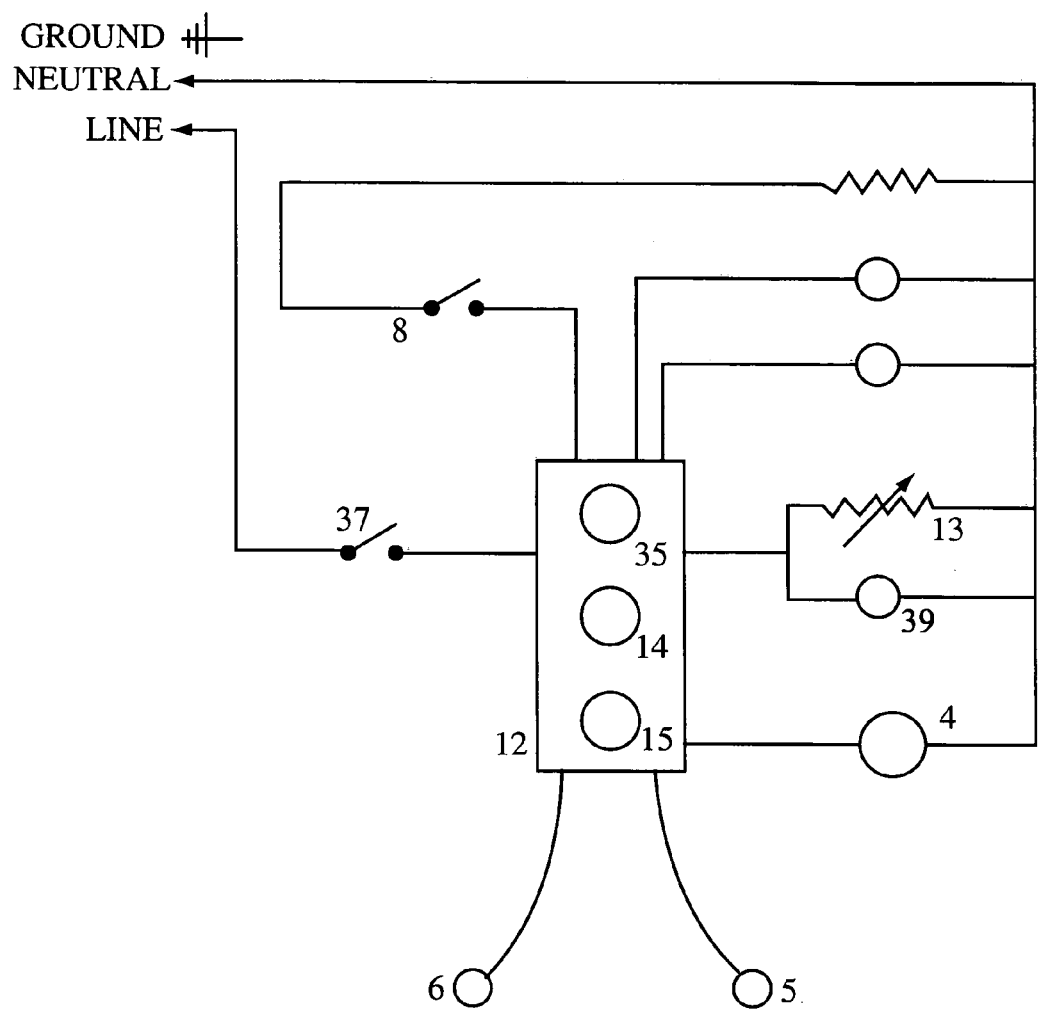
FIG. 5 is a block diagram showing the controls for the food cooking and heating apparatus shown in FIG. 1.

As best seen in the front view in FIG. 2 and the view in FIG. 5, the apparatus 1 is mounted on castors 46 so that it is portable.

Referring to FIG. 1, a food holding oven 11 is located within the cabinet 18. The inside of the front door 10 is the front wall of the oven 11. As will be described, a relatively uniform temperature is maintained throughout the food holding oven 11. The oven has perforated or louvered side walls 50 and 52 with rows of parallel angle supports 54 extending inward. The angle supports slidably receive a plurality of food trays 56 capable of holding a large number of food servings.

Figure 4:
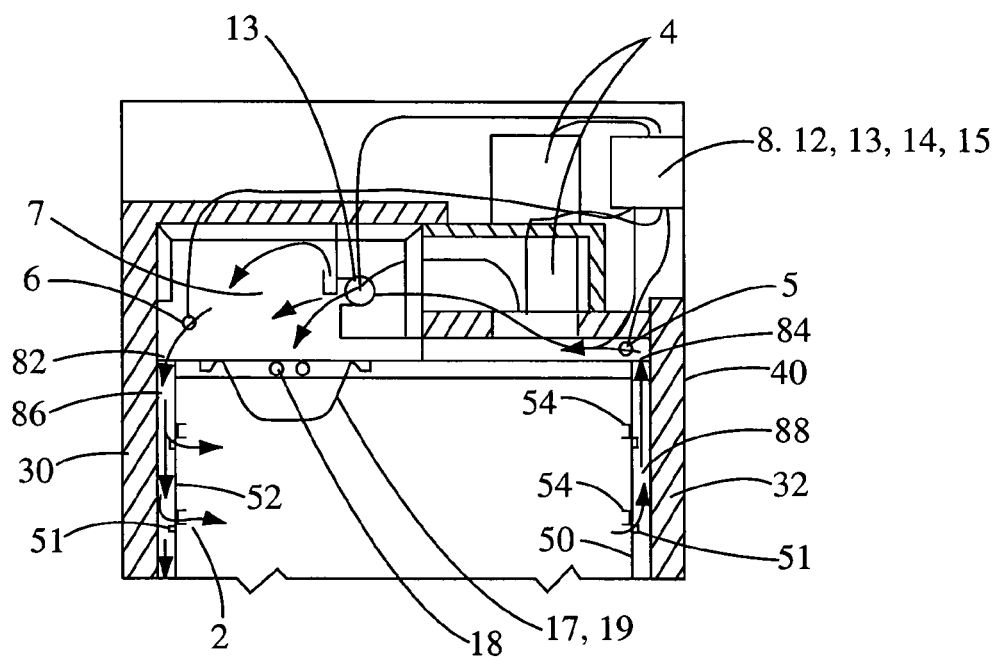
FIG. 4 is a sectional view taken along section line 4—4 of FIG. 3.

The food within the oven 11 is cooked or heated by an air heating convection system which includes an air heating chamber 7 seen in the enlarged view in FIG. 4. The arrows in FIG. 4 diagrammatically represent the path of air through the system. Above and below the air heating chamber 7 are layers of fiberglass 64 and 65 or other insulation for heat retention purposes.

The air heating chamber 7, a substantially airtight enclosure with two openings to be described, includes a variable blower or blowers 4 operated by one or more electric motors. It should be noted that the motor and associated wiring are outside of the air heating chamber 7. As will be appreciated, this avoids exposing the motor and wiring to the heated and sometimes grease-laden air passing through the air heating convection system. A variable heating element 13 within the air heating chamber is in the path of air as it is forced from the blower. An electric variable heating element is used in the present embodiment although other types may be employed.

Beneath the variable heating element 13 is an optional water tray 17. The surface of water in the water tray is exposed to the air heating chamber.

A pair of openings, outlet 82 and inlet 84 in the air heating chamber 7 is provided for passage of air as herein described.

As shown by the arrows, air is drawn through the bottom of the blower 4 and forced through the air heating chamber 7 past heating element 13, causing the air to be heated. The heated air is thereafter forced from the air heating chamber 7 through outlet 82 into a passageway 86 formed by a space between the cabinet side wall 30 and the oven side wall 52. The perforations or louvers 51 in the oven side wall are evenly spaced along the side of the oven 11, allowing the heated air to pass into and be distributed throughout the food holding oven 11.

The heated air distributed throughout the food holding oven thus heats the food therein by passing over the food holding trays 56. The air is thereafter forced from the oven through the perforations in the oven side wall 52 into a passageway 88 formed by a space between the cabinet side wall 32 and the oven side wall 52. The forced air is thereafter returned to the air heating chamber 7 through inlet 84.

The temperature of the air within the food holding oven is monitored by a pair of temperature sensors 5 and 6. Temperature sensor 6 is located on the out bound side of the heating chamber and temperature sensor 5 is located on the return side.

A cut-away top view in FIG. 4 of the air heating chamber 62 shows the circulation of air through the air heating convection system.

Returning to a consideration of FIGS. 1 and 2, the control panel 44 includes an on-off switch 37 and a pilot light 39. The apparatus is connected to normal electrical service by means of an electrical cord (not shown)

A controller 12 is provided to adjust the speed of the blower 4 and the temperature of the heater 13 in response to signals from sensors 5 and 6.

The blower 4 changes speed during the operation of the apparatus. As previously described, the temperature sensor 5 and 6 monitor the temperature of the air within the oven. When the temperature drops below the point set on the control panel, the contact is closed and the variable heating element 13 is adjusted. At the same time, the blower speed is adjusted. When the temperature of the air has reached the selected point, the heating element is lowered and the blower speed decreased. The control panel provides a variable temperature control 14 to set the cooking temperature and a temperature hold control. There is also a timer 35 that automatically shuts down both temperature and air changes over to a hold air/temperature set by control 15 in the event the finished product is not removed.

The oven has the capability of introducing moisture 17 into the heated air or adding a wood smoke flavor or odor to the product independently or in combination. The smoke taste and odor requires an additional heater 118 inside of a smoke pan 19 that is controlled from the control panel 2 and has its own control 8.

The oven heat source is comprised of one or more blowers 4 depending on application and as many heaters 13 required for the application. A controller 12 adjusts the speed of the blower motor(s) 4 and heater(s) 13 to meet the needs of the oven as predetermined by the control based on the temperature it senses from the sensor 6 at the out bound side of the heater (high pressure) and the return side sensor 5 (low pressure) of the blower(s). Placing a pan on the oven bottom cavity cross over panel assembly 53 for use as adjus or gravy, if desired, may collect the product drippings.

The blower motor(s) assemblies 4, heater(s) 13, smoker control 8 and timer 15 are commercially available. The temperature/speed control 12, is a modified commercially available item. With doors closed and operating the oven functions as follows. Simply stated, air 34 is drawn into the fan housings 4 and then forced into the heater compartment 7, through the heaters 13 in order to heat the air, then across the water pan 17 or smoker pan 19 if used, past the high temperature sensor 6 control and into the top of the high pressure entrance 82 of the duct, down the side wall, spilling some of the heated air out of its louvers, into the main oven cavity 11 and down the duct and across the bottom cavity cross over panel assembly 53, up the slightly negative pressure side panel, pulling in the spilled air from the main oven cavity, up the low pressure side duct, past the return air low temperature sensor 5, and back into the blower housing 4 to start its cycle over. The special temperature/airflow speed controller 12 is controlled as follows. When the product is loaded into the oven on pans 56 or racks the oven is set to cook at a temperature set by control 14 or hold temperature by control 16. With the product loaded, we will now set the cook timer 35 and turn the heat switch 37 on. The blower and heater activate now producing maximum heater power and airflow. As the temperature nears the preset temperature as sensed by the return air sensor 5, the amount of heat will be reduced to guard against burning, If the door 10 is opened during this time the return air sensor 5 will sense the drop in temperature and automatically increase the amount of heat and air until the door 10 is closed and the heat loss is recovered, reducing the heat and air flow to where it was before the door was opened. As the timer 35 nears the end of the cook cycle the blower speed and heat will be reduced to guard against drying the product at the end of its cook cycle. When both time and temperature presets have been obtained the control 8, 12, 13, 14, 15 will automatically switch to a desired hold temperature and air speed to maintain the succulent finished product or manually turned off and a product removed.

Whereas, the present invention has been described in particular relation to the drawings attached hereto, it should be understood that other and further modifications, apart from those shown or suggested herein, may be made within the spirit and scope of this invention.

What is claimed is:

1. A food cooking and heating apparatus comprising: a food holding oven having at least one door for access to the interior thereof, an air heating chamber having an inlet and an outlet, a variable air heating element within the air heating chamber, an air intake passageway to conduct heated air from the outlet of the air heating chamber to the food holding oven, an exhaust passageway to conduct air from the food holding oven to the inlet of the air heating chamber, an air temperature sensor located at the outlet of the heating chamber and a second sensor located at the inlet of the air heating chamber, a closed air convection system consisting of a variable speed blower in the air heating chamber for circulating air past the variable air heating element, through the intake passageway, through the food holding oven, through the exhaust passageway and back to the air heating chamber, a control for selecting a desired temperature to be maintained in the food holding oven, and a circuit for comparing the sensed temperature at the outlet and the sensed temperature at the inlet of the heating chamber to the selected temperature causing the variable air heating element to operate and the speed of the blower to increase when more heat is required and reduces both heat and blower speed as the need for the higher heat and air flow is no longer required, and when preset parameters are reached automatically sets the temperature to a preset temperature and holds the heated product to the predetermined temperature.

2. A food cooking and heating apparatus comprising: a food holding oven having at least one door for access to the interior thereof, an air heating chamber having an inlet and an outlet, a variable air heating element within the air heating chamber, an air intake passageway to conduct heated air from the outlet of the air heating chamber to the food holding oven, an exhaust passageway to conduct air from the food holding oven to the inlet of the air heating chamber, an air temperature sensor located at the outlet of the heating chamber and a second sensor located at the inlet of the air heating chamber, a closed air convection system consisting of blower means in said heating chamber for circulating air past the variable air heating element, through the intake passageway, through the food holding oven, through the exhaust passageway and back to the air heating chamber, variable air volume means to vary the volume of air through said closed air convection system; means for selecting a desired temperature to be maintained in the food holding oven, and a circuit for comparing the sensed temperature at the outlet and the sensed temperature at the inlet of the heating chamber to the selected temperature causing the variable air heating element to operate and the speed of the blower to increase when more heat is required and reduces both heat and blower speed as the need for the higher heat and air flow is no longer required.

3. A food cooking and heating apparatus as set forth in claim 2, including casters to provide portability for the apparatus.

4. A food cooking and heating apparatus as set forth in claim 2 including a timer circuit wherein the food holing oven may be heated to a desired temperature for a period of time to cook said food and then maintain it a desired serving temperature.

5. A food cooking and heating apparatus as set forth in claim 2 including a removable water pan wherein water in said pan is exposed to said air heating chamber.

6. A food cooking and heating apparatus as set forth in claim 2 including removeable food holding pans within said food holding chamber.

7. A food cooking and heating apparatus as set forth in claim 2 including a wood smoke flavor means for providing a smoke taste and odor into the food holding chamber.

* * * * *